(12) United States Patent
Hutt et al.

(10) Patent No.: US 10,558,189 B2
(45) Date of Patent: Feb. 11, 2020

(54) SAFETY CONTROL SYSTEM HAVING CONFIGURABLE INPUTS

(71) Applicant: PILZ GMBH & CO. KG, Ostfildern (DE)

(72) Inventors: Thilo Hutt, Ostfildern (DE); Dietmar Seizinger, Ostfildern (DE); Marco Kluge, Ostfildern (DE); Stephan Lehmann, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 202 days.

(21) Appl. No.: 15/152,018

(22) Filed: May 11, 2016

(65) Prior Publication Data

US 2016/0252891 A1    Sep. 1, 2016

Related U.S. Application Data

(63) Continuation of application No. PCT/EP2014/074389, filed on Nov. 12, 2014.

(30) Foreign Application Priority Data

Nov. 13, 2013   (DE) .................. 10 2013 112 488

(51) Int. Cl.
    *G05B 19/048*    (2006.01)
(52) U.S. Cl.
    CPC .. *G05B 19/048* (2013.01); *G05B 2219/23265* (2013.01); *G05B 2219/24008* (2013.01)
(58) Field of Classification Search
    CPC ............. G05B 19/0423; G05B 19/048; G05B 2219/1138; G05B 2219/1144;
    (Continued)

(56) References Cited

U.S. PATENT DOCUMENTS 5,416,480 A * 5/1995 Roach ............... G05B 19/0423
                                              341/110
5,757,672 A * 5/1998 Hoepken ............. G08B 26/001
                                              340/538

(Continued)

FOREIGN PATENT DOCUMENTS

CN    201896625 U    7/2011
CN    103034184 A    4/2013

(Continued)

OTHER PUBLICATIONS

Google Search, "PLC Input Module", Sep. 27, 2019 (accessed from <<https://www.google.com/search?q=plc+input+module&rlz=1C1GCEB_enUS817US817&sxsrf=ACYBGNR13SCFNUYTviWdJWZ1UfEPvFpFtg:1569623257276&source=lnms&tbm=isch&sa=X&ved=0ahUKEwiOj7mlhvLkAhUJTt8KHRxuBMYQ_AUIEigB&biw=1933&bih=1051>>) (Year: 2019).*

(Continued)

*Primary Examiner* — Michael J Huntley
(74) *Attorney, Agent, or Firm* — Harness, Dickey & Pierce, P.L.C.

(57) ABSTRACT

A safety control system for switching on and safely switching off at least one actuator, including at least one input module for evaluating an input signal of a safety transmitter and for generating an output signal, and at least one output module for the safe actuation of the at least one actuator as a function of the output signal of the input module. The input signal has different signal parameters as a function of the type of safety transmitter. Furthermore, the safety control system includes a setting unit having a memory in which the signal parameters for the input module are stored, and the input module evaluates the input signal as a function of the signal parameters.

8 Claims, 4 Drawing Sheets

(58) Field of Classification Search
CPC .......... G05B 2219/21085; G05B 2219/21087; G05B 2219/23265; G05B 2219/24008
See application file for complete search history.

(56) References Cited

U.S. PATENT DOCUMENTS

| | | | |
|---|---|---|---|
| 5,777,834 A * | 7/1998 | Lehner | G05B 9/03 361/66 |
| 6,246,318 B1 | 6/2001 | Veil et al. | |
| 6,397,322 B1 * | 5/2002 | Voss | H02H 9/008 340/532 |
| 6,417,582 B1 | 7/2002 | Dold et al. | |
| 7,187,091 B2 * | 3/2007 | Veil | F16P 3/00 307/326 |
| 7,386,086 B1 * | 6/2008 | Harbaugh | G05B 19/0425 235/492 |
| 7,656,629 B2 | 2/2010 | Pullmann | H01H 47/002 361/62 |
| 7,707,319 B2 * | 4/2010 | Vasko | G05B 19/0423 709/224 |
| 8,522,204 B2 * | 8/2013 | Moosmann | G05B 9/03 717/117 |
| 8,595,827 B2 * | 11/2013 | Zondler | G05B 9/02 700/20 |
| 8,996,754 B2 | 3/2015 | Hildebran et al. | |
| 2007/0091518 A1 * | 4/2007 | Pullmann | H01H 47/002 361/23 |
| 2009/0030534 A1 * | 1/2009 | Dold | G05B 19/0426 700/83 |
| 2009/0187306 A1 | 7/2009 | Grimes et al. | |
| 2009/0198348 A1 * | 8/2009 | Murphy | G05B 19/0421 700/7 |
| 2010/0235682 A1 | 9/2010 | Yoshida et al. | |
| 2011/0098830 A1 * | 4/2011 | Weddingfeld | G05B 9/02 700/79 |
| 2011/0204729 A1 | 8/2011 | Lorenz et al. | |
| 2012/0043957 A1 * | 2/2012 | Naumovic | G05B 19/0423 324/72 |
| 2012/0139615 A1 | 6/2012 | Zimmermann | |
| 2012/0256566 A1 | 10/2012 | Chaffee | |
| 2012/0265322 A1 | 10/2012 | Hildebran et al. | |
| 2014/0028453 A1 | 1/2014 | Schwenkel et al. | |
| 2014/0101486 A1 | 4/2014 | Henneberger et al. | |

FOREIGN PATENT DOCUMENTS

| | | | |
|---|---|---|---|
| CN | 103064354 A | 4/2013 | |
| CN | 202995404 U | 6/2013 | |
| DE | 197 07 241 A1 | 9/1998 | |
| DE | 199 11 698 A1 | 9/2000 | |
| DE | 10 2011 016 137 A1 | 10/2012 | |
| EP | 2066037 A1 * | 6/2009 | .......... H03M 1/1071 |
| EP | 2098925 A1 * | 9/2009 | .......... G05B 19/042 |
| EP | 2 461 221 A2 | 6/2012 | |
| EP | 2 511 778 A2 | 10/2012 | |
| EP | 2 720 098 A1 | 4/2014 | |
| FR | 2924226 B1 * | 2/2010 | .......... H03M 1/1071 |

OTHER PUBLICATIONS

English language translation of International Preliminary Report on Patentability (Chapter I) for PCT/EP2014/074389; dated May 17, 2016; 13 pp.

PSSuniversal—Programmable control systems PSS®, System Description—No. 21256-EN-04; Oct. 2010; 89 pp.

International Search Report for PCT/EP2014/074389; dated Jan. 7, 2015; 2 pp.

* cited by examiner

SAFETY CONTROL SYSTEM HAVING CONFIGURABLE INPUTS

CROSS-REFERENCES TO RELATED APPLICATIONS

This application is a continuation of international patent application PCT/EP2014/074389, filed on Nov. 12, 2014 designating the U.S., which international patent application has been published in German language and claims priority from German patent application DE 10 2013 112 488.7, filed on Nov. 13, 2013. The entire contents of these priority applications are incorporated herein by reference.

BACKGROUND OF THE INVENTION

This disclosure relates to a safety control system for switching on and safely switching off at least one actuator.

Such a safety control system is known, for example, from the operating instructions "PSSuniversal, Programmable control systems PSS®, System Description," article number 21256-DE-04, by the applicant.

Accordingly, in the context of the present disclosure, a safety control system is a preferably modular device having at least one input module and one output module. The input modules receive input signals from connected safety transmitters, for example, light barriers, light curtains, emergency stop pushbuttons, or protective door switches, and generate output signals from them via logical linking. In response to the output signals, the output modules drive actuators, which effectuate targeted actions or a response in the surroundings as a function of the input signals, for example, in order to switch off a machine such as a press or a welding robot, which poses a risk during operation, or to bring it into a safe condition.

Safety transmitters are differentiated into two types of safety transmitters. The first type of safety transmitters are passive safety transmitters, which generate no input signal themselves. Passive safety transmitters receive a test signal from an external source, usually from the safety control system, in the form of a static potential or a clock signal, and send it unchanged to an evaluating safety control system if the safety transmitter indicates a safe condition. If the state changes, for example, because the safety transmitter has been actuated, the safety transmitter interrupts the signal flow. The safety control system detects the change in state based on the absent signal.

One passive safety transmitter, for example, is a two-channel emergency stop switch having two normally closed contacts. In this context, normally closed contact means that the signal path to be switched is closed in the normal, non-actuated state. Therefore, in the non-actuated state, test signals which are routed to the safety transmitter on the input side are present unchanged at its outputs. The outgoing signals from the safety transmitter are in turn the input signals of the evaluating safety control system, so that an input signal is always applied to the safety control system during normal operation. As soon as the emergency stop switch is actuated, the signal flow is interrupted and the input signals are absent. Thereupon, the safety control system may switch off the machine to be monitored or bring it into a safe condition.

Furthermore, antivalent two-channel safety transmitters are known in the form of passive safety transmitters, which have one normally closed contact and one normally open contact which are positively linked, instead of two normally closed contacts. A normally open contact is the opposite of a normally closed contact; i.e., in the normally open contact, the signal path is normally open and is closed only when the switch is actuated. In an antivalent two-channel safety transmitter, a signal path is thus closed and another signal path is open in every state. In this case, the safety control system detects the state change in that a signal is present at an input at which no signal was previously present, whereas the signal is absent at a second input.

Active safety transmitters are known as another type of safety transmitters. They automatically generate an input signal which represents their respective state. Active safety transmitters, which are also referred to as output signal switching devices (OSSDs), and whose input signals for the safety control system are referred to as OSSD signals, are generally more complex safety transmitters such as light barriers and light curtains. OSSDs generally have their own electronic unit for evaluating the monitoring components and for generating the OSSD signal. As with passive safety transmitters, the associated safety control system detects the state change of an active safety transmitter in that the input signals are absent or change.

In both passive and active safety transmitters, the input signal which represents the state of the safety transmitter is generally a static potential which is preferably superimposed with test pulses, in order to be able to detect faults when connecting the safety transmitters, as well as short circuits and cross-short circuits on the signal lines. In addition, switch-off tests may also be carried out by means of the test pulses. The clock signals are generally generated by the safety control system, and are superimposed directly on the input signals in the case of passive safety transmitters, or indirectly in the case of active safety transmitters. By reading back the clock signals at the inputs, the safety control system may close for any possible faults.

In the case of passive safety transmitters, the superimposition with a dynamic clock signal generally takes place directly, in that the test signals which are sent to the safety transmitters already have the clock. In the case of active safety transmitters, which generate the input signal automatically, the dynamic clock signals may be either self-generated according to a specified scheme or triggered externally. The latter takes place via a separate test input at the safety transmitter, at which a clock may be fed in, on the basis of which the safety transmitter may impress test impulses on the input signal.

In order to connect the different types of safety transmitters to one safety control system, it is conceivable to provide a specific input module for each type of safety transmitter. Alternatively, input modules are possible which have filters at the inputs which allow connecting different types of safety transmitters to one input module. The filters suppress test pulses, so that static signals are available for the logical evaluation. However, this necessarily results in the evaluation being delayed overall; thus, the response time of the safety control system increases.

Furthermore, input modules are known which have different inputs and, depending on the configuration of these inputs, close according to the type of the connected safety transmitter. Such a safety switching device is described, for example, in DE 197 07 241 C2. However, these devices have the disadvantage that the input modules also have inputs, so that wiring is more complex and error-prone. In addition, it is possible to cover only a limited number of different safety transmitter types by means of these input modules.

SUMMARY OF THE INVENTION

It is an object to provide a better safety control system. Further, it is an object to provide a safety control system, which may be used more flexibly with a plurality of different safety transmitters. Furthermore, it is an object to provide a safety control system, which may be used more economically with a plurality of different safety transmitters.

In accordance with an aspect of the present disclosure, a safety control system for switching on and safely switching off at least one actuator is provided, including at least one input module for evaluating an input signal of a safety transmitter and for generating an output signal, and at least one output module for the safe actuation of the actuator as a function of the output signal of the input module, a safety control system is provided of the type initially specified, wherein the input signal has different signal parameters as a function of the type of safety transmitter, wherein the safety control system includes a setting unit having a memory in which the signal parameters for the input module are stored, wherein the input module evaluates the input signal as a function of the signal parameters.

In accordance with a further aspect of the present disclosure, a method for switching on and safely switching off at least one actuator is provided, including the steps of:
  providing a safety transmitter for generating an input signal as a function of a safety-critical process to be monitored;
  providing a safety control system having at least one input module and one output module;
  storing signal parameters for the input signal as a function of the type of safety transmitter in a setting unit of the safety control system,
  evaluating the input signal via the input module as a function of the signal parameters stored in the setting unit;
  generating an output signal for the output module as a function of the evaluation;
  actuating the actuator via the output module as a function of the output signal.

It is thus one idea of the present disclosure to make the safety control system, in particular the input modules, configurable, so that it is possible to carry out an individual adjustment to the connected safety transmitter. For this purpose, the safety control system has a setting unit either in the input modules themselves or in a central head unit, in which signal parameters may be stored. Signal parameters are information via which the characteristics of the input signal may be described, for example, the physical depiction variable such as amplitude, phase, or frequency of a signal. In addition, the signal parameters may also contain relative information which describes a signal change caused by the signal transmitter.

The setting unit may, for example, be a programmable memory in which parameter values may be stored as variables. The programming may take place manually via user inputs to the safety control system or by loading external data. Alternatively, signal parameters may also be transferred to the safety control system via the connected safety transmitters.

The storable signal parameters describe the input signal of the connected safety transmitter and may be used by the input module for the evaluation. Thus, it is possible to adjust the evaluation more precisely to the expected input signal. The response time of the safety control system is determined essentially from the signal propagation time, i.e., the period of time which is required from the actuation of the safety transmitter up to the triggering of the output signal and the switching of the connected actuators. The signal propagation time is thus obtained from the sum of the individual processing times of the components involved. While the processing times of the electronic components are determined in the safety transmitter and the safety control system by the respective propagation delays, which are typically in the range of a few nanoseconds, the time of the evaluation of the input signals at the inputs is significantly higher due to input filters and evaluation tolerances. However, if the expected input signal is known to the safety control system, the input filters may be adjusted to the input signal or possibly even be omitted. Likewise, the respective tolerance ranges in which a certain value of the input signal is safely detected may be reduced for threshold value detection. The evaluation is thus more reliable and in particular faster, so that the availability and the response speed of the safety control system are increased overall.

Particularly advantageously, safety transmitters from different manufacturers may be used with the new safety control system. All commercially available safety transmitters may be connected to the new safety control system. As a result, the safety control system becomes more flexible overall. In particular, such a safety control system may be easily retrofitted in the case of existing systems.

In addition to the precise evaluation of the states of the safety transmitters, the superimposed test signals may advantageously also be detected and evaluated in detail. Therefore, it is also possible to use safety transmitters which previously required specific input modules. In particular, active safety transmitters, which apply test signals to the input signals independently of the control unit, may be used on the new safety control system without having to use a specific, often proprietary input module.

In a refinement, the input signal is a dynamic clock signal with test pulses, wherein a first signal parameter represents the test period between the test pulses and a second signal parameter represents the test pulse duration.

According to this refinement, the input signal is a dynamic clock signal to which test pulses are applied in a regular cycle. The test pulses are preferably rectangular pulses having a defined pulse duration, which repeat within an established test period. Preferably, the test period and the test pulse duration are stored as signal parameters, so that during the evaluation, it is known when a test pulse occurs at the input and how long it lasts. On the one hand, it may thus be ensured that a state change at the input is not falsely regarded as a state change of the safety conditions, and on the other hand, it may be checked whether the test pulses occur at the intended interval and for the intended duration. In this way, it is possible to discover wiring errors, errors in the safety transmitters, or cross-short circuits/short circuits on the signal lines.

In a further refinement, the input module has a first input for connecting the safety transmitter and at least a second input for connecting an additional safety transmitter, wherein a first set of signal parameters may be stored in the setting unit for the safety transmitter, and a second set of signal parameters may be stored in the setting unit for the additional safety transmitter.

According to this refinement, the signal parameters for a safety transmitter are thus combined into one set. Furthermore, an input module may have multiple inputs for which different parameter sets are stored. In this way, an individual input module may simultaneously process different signals of different safety transmitters. Preferably, an input module also has different clock outputs, via which different clock signals may be applied to the safety transmitters at the inputs. The flexibility of the input modules is further increased by the additional inputs.

In a further refinement, the safety control system has at least one test output for providing a test signal, wherein the safety transmitter generates the input signal with a delay time Δt as a function of the test signal, wherein the delay time Δt is a parameter of the signal parameters.

According to this refinement, at least one safety transmitter has a test input for receiving a test signal, via which the functional capability of the safety transmitter may be checked. For example, a test pulse may be sent cyclically to the sensor as a test signal. The safety transmitter preferably responds to the test pulse with a similar pulse on the input signal generated by the safety transmitter. Depending on the sensor type, the response of the safety transmitter may be delayed by a delay time Δt. The value for Δt is stored with the signal parameters in the setting unit and taken into account during evaluation. In this way, the input signals, for example, from active safety transmitters via an externally triggered test, may also be evaluated more safely and precisely.

In a further refinement, the safety transmitter is connected to the safety control system via an electrical line having specific characteristics, wherein the signal parameters have additional parameters which represent the specific characteristics.

The specific characteristics include, for example, the cable type used, the cable length, or other values of the electrical line which change or affect the input signal in any manner. In this way, a more precise adjustment to the safety transmitters may occur, being a function not only of the signal transmitters, but also of the application-specific characteristics. In particular, capacitive effects on the line may strongly affect the input signal and delay a safe evaluation. If the capacitive effects are known for the evaluation, the evaluation time may be correspondingly adjusted, for example, via input filters.

In a further refinement, the safety control system has a configuration system with a communication interface for configuring the setting unit, wherein a set of signal parameters may be transferred to the setting unit via the communication interface.

The setting unit may be programmed with signal parameters via the configuration system. Preferably, a set of signal parameters may be compiled on an external system, for example, a PC, and subsequently transferred as a block to one or multiple safety control systems. A network or bus connection may be used as a communication interface. Alternatively, the communication interface may also be designed as a reader for a portable memory medium. A safe configuration may be made possible via the configuration system.

Particularly preferably, the set of parameters for a safety transmitter is stored in a sensor definition file, wherein the sensor definition file includes a sensor data section with safety transmitter-specific parameters and an application data section with application-specific parameters.

In this way, sensor-dependent and application-dependent data are stored separately from each other and are merged only for the specific application case. This has the advantage that the application-specific parameters must be specified only during commissioning, while the data for the safety transmitter (electronic data sheet) may preferably be provided from a library. As a result, the setting becomes simpler on the one hand and safer in addition, since it is not possible to enter false parameters for a sensor.

Particularly preferably, the sensor definition file furthermore has an individual checksum, on the basis of which the configuration system authenticates the sensor definition file.

In this way, the sensor definition file is protected from modifications which could result in an erroneous configuration of the safety control system.

Furthermore, in a particularly preferred refinement, the configuration system has a check algorithm for checking plausibility, which checks the application data section with respect to the sensor data section. With the aid of the plausibility check, it is checked whether the application-specific parameters input by the user match the sensor-specific parameters. The plausibility check could, for example, contain a verification which ensures that the cable length used does not exceed a limit value established for the safety transmitter. Likewise, it could be ensured by means of the plausibility check that the configuration corresponds to an appropriate safety level. Furthermore, interconnection errors could be detected at an early stage during configuration and eliminated. The safety control system and the configuration thereof are thus safer and less error-prone.

BRIEF DESCRIPTION OF THE DRAWINGS

Exemplary embodiments of the present invention are illustrated in the drawings and are described in greater detail in the description below. In the drawings.

DESCRIPTION OF PREFERRED EMBODIMENTS

Figure 1:
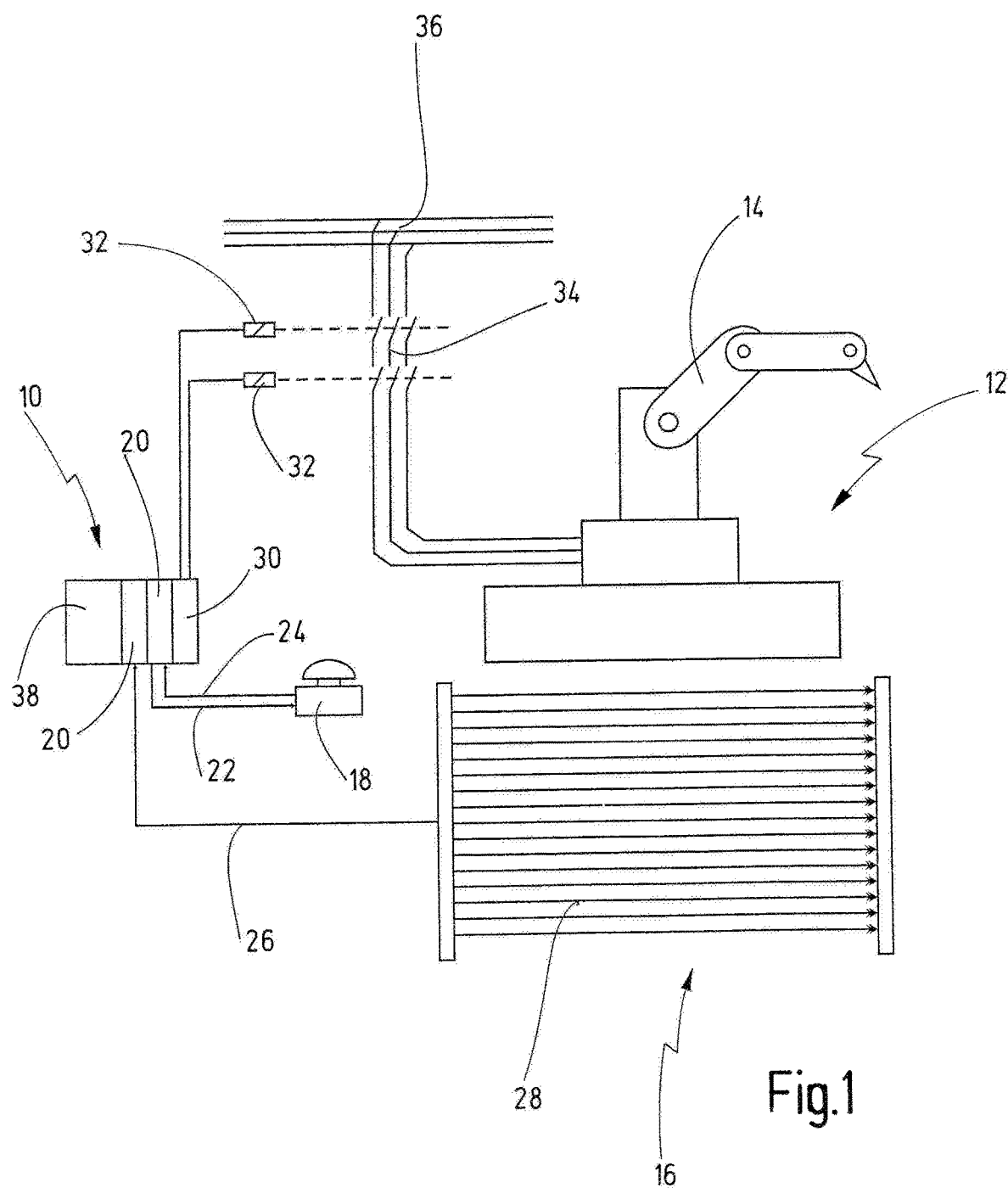
FIG. 1 shows a simplified representation of a preferred exemplary embodiment of the new safety control system.

FIG. 1 depicts one exemplary embodiment of the new safety control system in its entirety, having the reference numeral 10. The depicted exemplary embodiment is a safety control system which is used here for protecting a technical system 12. In this example, the technical system 12 is an automated robot 14, the hazard zone of which is delimited by a light curtain 16 for protecting persons. Furthermore, an emergency stop switch is indicated by the reference numeral 18, via which the robot may be switched off in case of danger.

The light curtain 16 and the emergency stop switch 18 are each connected to an input module 20 of the safety control system 10. The connection of the emergency stop switch 18 is established via a first line 22 and via a second line 24. The light curtain 16 is connected to the input module 20 via a single line 26.

The light curtain 16 and the emergency stop switch 18 are different types of safety transmitters. The light curtain 16 is an active safety transmitter and the emergency stop switch 18 is a passive safety transmitter. The safety transmitters differ, as shown, in the connection type on the one hand, and on the other hand, in the signaling of the state of the safety-critical process to be monitored.

The light curtain 16 is a so-called OSSD device. It is designed to automatically generate a signal which indicates each state of the light curtain. If the light curtain is in normal operation, i.e., the light rays 28 relevant for determining the safety-critical state are not interrupted by an object or a person, the light curtain 16 sends a defined input signal to the safety control system via the line 26. The signal generated by an active safety transmitter is often referred to as an OSSD signal, and the corresponding line is referred to as an OSSD line. Preferably, the OSSD signal is redundantly transmitted from the safety transmitter to the safety control system 10. The OSSD line 26 is thus preferably designed to have two channels, wherein this typically takes place via a line with multiple wires, in which each wire transmits the signal of a single channel. In another exemplary embodiment, the light curtain 16 may also have a test input for receiving a test signal, via which the OSSD signal is influenced in a targeted manner, as explained in greater detail below. The test signals may be used inter alia to detect a cross-short circuit between two wires of an individual line.

The emergency stop switch 18 is a passive safety transmitter which does not generate a signal automatically. Rather, an external test signal is supplied to the passive safety transmitter, preferably by the safety control system, which the passive safety transmitter provides on the output side as an input signal. In the depicted exemplary embodiment, a signal is routed to the emergency stop switch 18 via the line 22. Here, the emergency stop switch 18 has two normally closed contacts which route the signal from the line 22 to the line 24 in the non-actuated state. Via the line 24, the test signal thus returns to the input module 20 as an input signal. If the emergency stop switch 18 is actuated, the normally closed contacts are opened, and the signal flow from the line 22 to the line 24 is interrupted.

Both the light curtain 16 and the emergency stop switch 18 thus show the state which they represent in that they either send or do not send an input signal to the input module 20. In this case, the safety-critical state is preferably represented by the absence of the input signal.

If the input signal from one of the two safety transmitters 16, 18 is absent, the safety control system may deactivate the robot 14 or bring it into a non-hazardous state. In the present exemplary embodiment, for this purpose, the safety control system 10 has an output module 30 to which two contactors 32 are connected. The contacts 34 of the contactors 32 are connected in series in the power supply 36 of the robot 14. If both contactors 32 are activated, the robot 14 is supplied with current.

If the input signal of the safety transmitters 16, 18 is absent at one of the input modules 20, the safety control system 10 initiates the deactivation of the contactors 32 via the output module 30, causing the robot 14 to be disconnected from the power supply 36.

The safety control system 10 may also be connected via a head module 38 to a superordinate controller, which is not depicted here in greater detail. The connection to the superordinate controller may be carried out via commonly used field bus systems for standard control function or via specific safe buses such as the Safety-bus P, which the applicant markets for safety-related functions. The head module 38 thus includes at least one central processing unit and an interface for communication.

The various kinds of safety transmitters are explained in greater detail below based on FIGS. 2a, 2b, and 2c.

Figure 2A:
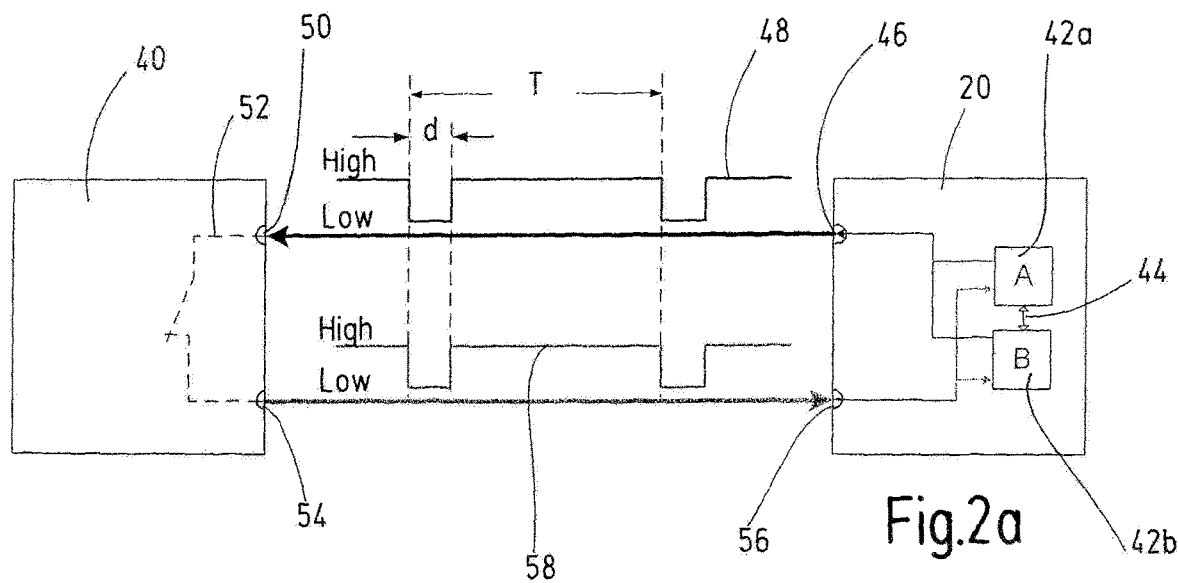
FIG. 2a-2c show schematic representations of different types of safety transmitters.

FIG. 2a shows a schematic representation of a passive safety transmitter 40 which is connected to an input module 20. The passive safety transmitter 40 could, for example, be an emergency stop switch 18 according to the exemplary embodiment according to FIG. 1. Here, the input module 20 has a first and a second evaluation unit 42a, 42b. These are preferably two microcontrollers which are designed to evaluate an input signal redundantly. Alternatively, the evaluation may also be carried out via a different signal-processing unit. The evaluation units 42a, 42b are designed in such a way that they are able to monitor each other, as indicated by the double arrow 44. As a result of the monitoring 44 and the preferably different design of the evaluation units 42a and 42b, a very high level of safety may be ensured when evaluating the input signals.

The input module 20 has a test output 46. A test signal 48 is provided by the evaluation units 42a, 42b via the test output 46. Here, the test signal 48 is a static potential, which is made dynamic by interrupting the test signal for a test pulse duration d at an interval T, the so-called test period. The test signal 48 is received by a safety transmitter input 50 and routed to a safety transmitter output 54 via a normally closed contact 52, which is shown here by dashed lines. The safety transmitter output 54 is connected to the input 56 of the input module 20, so that the test signal 48 is present, directly and unchanged, as an input signal 58 at the input 56.

Due to the direct connection between the safety transmitter input 50 and the safety transmitter output 54 via the normally closed contact 52, the same signal is normally present at the input 56 as is present at the test output 46. The evaluation unit 42a, 42b may therefore derive the expected signal profile of the input signal 56 directly from the test signal 48. FIG. 2a shows the idealized signal profile of the test signal 48 and the input signal 58. The switch-on and switch-off edges, which are depicted in an idealized manner, do not actually rise and fall abruptly, but are respectively accompanied by a delay, wherein the delay may be in the form of the ramp or edge slope of one of the signal parameters which describe the input signal.

Figure 2B:
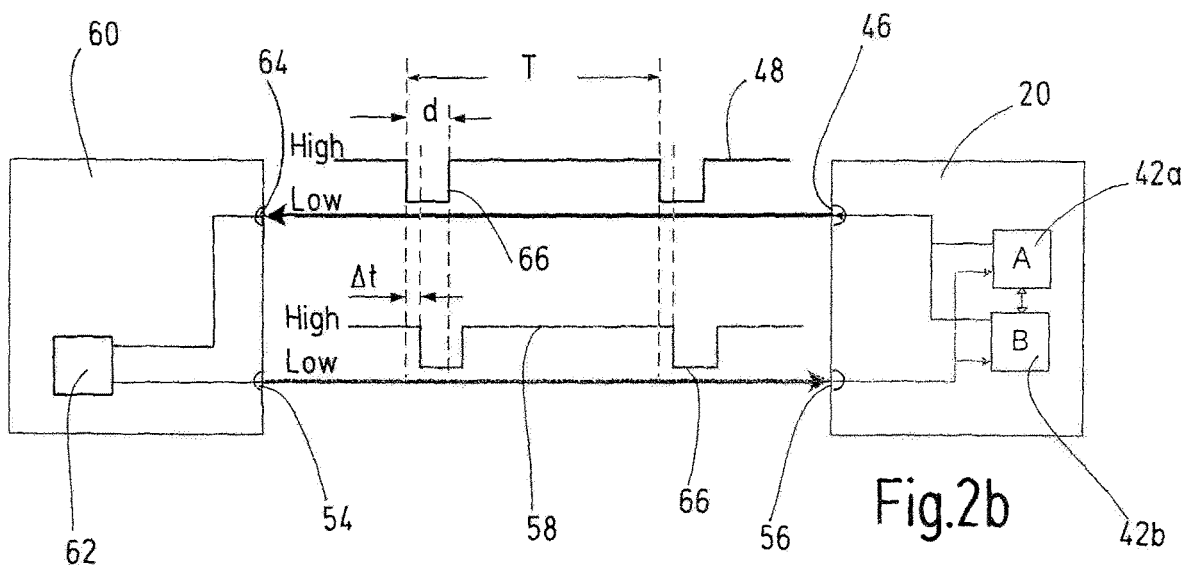

FIG. 2b shows an additional input module 20, also including a redundant evaluation unit 42a, 42b, as well as a test signal output 46 and an input 56. As in FIG. 2a, a test signal 48 having a test period T and a test pulse duration d is provided via the test signal output 46. In this case, the connected safety transmitter is an active safety transmitter 60. The active safety transmitter 60 could, for example, be a light barrier or a light curtain according to the exemplary embodiment of FIG. 1. In contrast to a passive safety transmitter 40, the active safety transmitter 60 has a signal transmitter unit 62 which automatically generates an input signal 58 and provides it at the safety transmitter output 54.

In the exemplary embodiment according to FIG. 2b, the active safety transmitter 60 receives the test signal 48 of the input module at a test input 64. The test signal 48 is provided to the signal transmitter unit 62, so that the signal transmitter unit 62 is able to take the test signal 48 into account during the generation of the input signal 58. In the exemplary embodiment according to FIG. 2b, the signal transmitter unit 62 transfers the test pulses 66 to the input signal 58. The test pulses 66 on the input signal 58 thus ideally have the same test period T and the same test pulse duration d. However, the test pulses 66 of the input signal may be shifted with respect to the test pulses 66 of the test signal 48 by a delay time $\Delta t$. The delay time may, for example, be caused by the signal processing by the signal transmitter unit 62. Due to the delay time $\Delta t$, the evaluation units 42a, 42b are not able to directly derive the signal profile of the input signal 58 from the test signal 48.

In the new safety control system, the delay time $\Delta t$ may be stored as an additional signal parameter in the setting unit, which is not depicted here. The evaluation units 42a, 42b may read out this value and take it into account during the evaluation. Thus, the evaluation units 42a, 42b may be adjusted directly to the input signal, whereby the evaluation is accelerated, since no additional tolerance range has to be established.

Figure 2C:
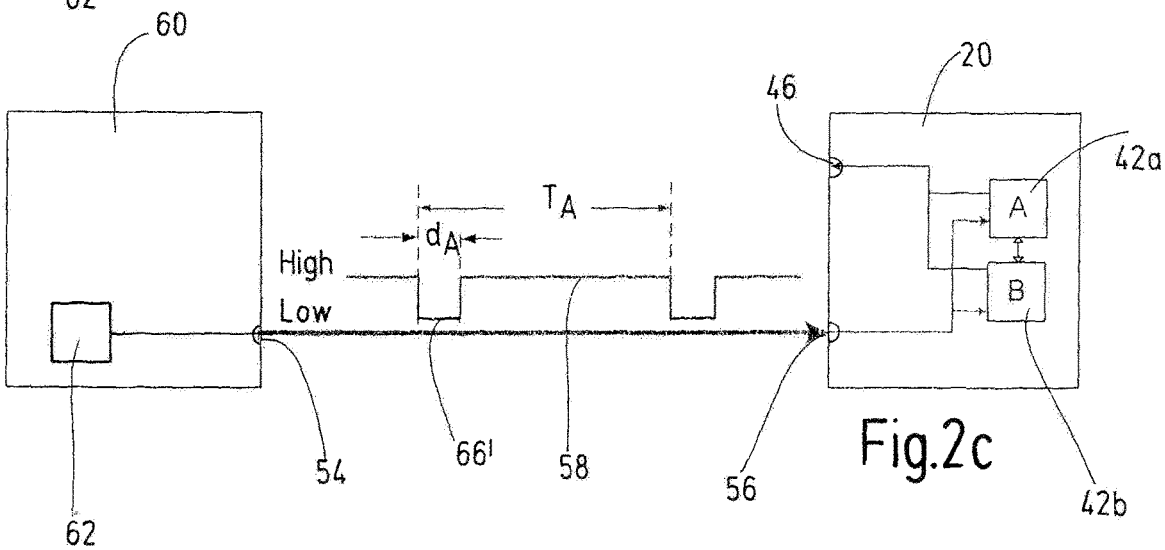

FIG. 2c shows an additional connection option for an active signal transmitter 60 to an input module 20. In this exemplary embodiment, the test output 46 of the input module 20 is not connected. There is only one connection between the safety transmitter output 54 and the input module input 56. The active safety transmitter 60 automatically generates an output signal 58 by means of the signal transmitter unit 62. In this case, the signal transmitter unit 62 automatically modulates test pulses 66' onto the input signal 58. The test pulses 66' repeat having a period $T_A$ with a test pulse duration $d_A$. The test pulses 66' are thus generated independently of the input module 20. The evaluation unit 42 is therefore not able to use a reference variable for evaluating the input signal 58. In the new safety control system, the values for the period $T_A$ and/or the test pulse duration $d_A$ may be stored. The evaluation units 42*a*, 42*b* may access these values and evaluate the input signal 58 correspondingly.

The exemplary embodiments of safety transmitters 40, 60 shown in FIGS. 2*a* to 2*c* may all be connected to the new safety control system despite the different input signals which they generate. For this purpose, the specific signal parameters for each safety transmitter are stored by the user in the setting unit and provided to the corresponding input module. By adjusting the signal parameters, the input module may be adjusted to the different safety transmitters in a variable manner. In this case, different sets of signal parameters may also be stored in the setting unit for multiple input modules.

It is to be understood that that the signal parameters are not limited to the examples shown. In addition to the aforementioned examples, other information describing the input signal 58 may also be used as signal parameters. In addition to absolute information, relative information or weighting factors are also conceivable. The signal parameters are also not limited to influences of the safety transmitters, but may also include other parameters which describe the input signal, for example, the value for the capacitance and/or the resistance of the feed lines.

Figure 3:
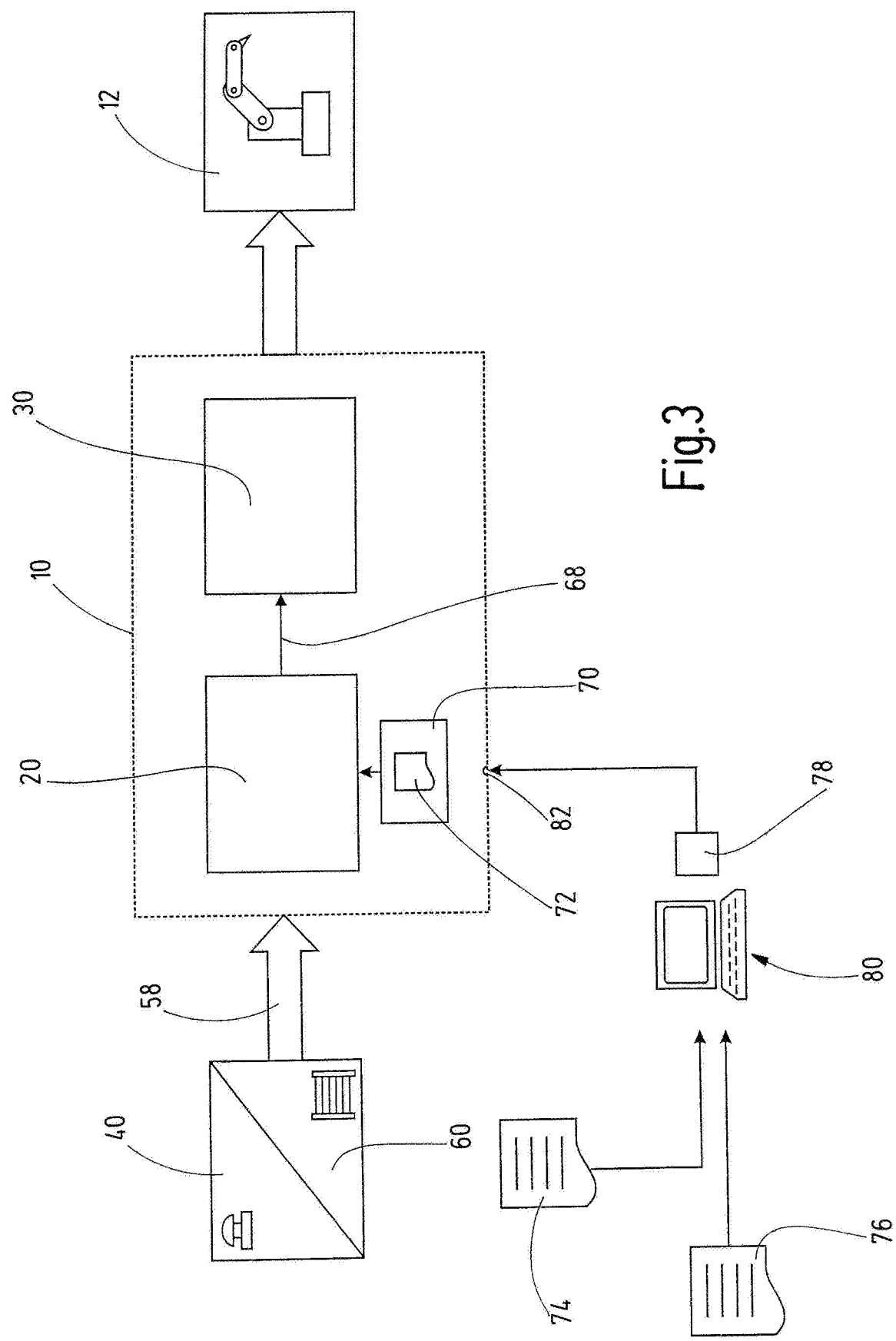
FIG. 3 shows a schematic representation of the new safety control system.

FIG. 3 schematically depicts the structure and the function of the new safety control system 10. Different safety transmitters 40, 60 may be connected to the safety control system 10. Here, an emergency stop switch is shown having the reference numeral 40, representing passive safety transmitters. Here, the reference numeral 60 represents active safety transmitters, as indicated by the light curtain. The safety transmitters 40, 60 send their input signal 58 to the safety control system 10. The safety control system 10 may also have outgoing connections to the safety transmitters, which are omitted here for the sake of clarity.

Here, the safety control system 10 has at least one input module 20 and one output module 30. As described in greater detail below, the input module 20 evaluates the input signal 58 and provides an output signal 68 as a function of the input signal 58. On the basis of the output signal 68, the output module drives the technical system 12 and possibly switches it off or brings it into a safe condition.

The safety control system 10 has a setting unit 70, in which signal parameters 72 for the evaluation of the input signal 58 are stored. The signal parameters 72 are values which describe the signal profile of the input signal 58. The description of the input signal 58 via the signal parameters 72 does not necessarily have to be complete, but may be limited only to the parameters which are necessary to evaluate the input signal precisely and in a failsafe manner.

In this case, the signal parameters 72 are preferably made up of a safety transmitter-specific part 74 and an application-specific part 76. The safety transmitter-specific part includes the signal parameters 72 which are functions exclusively of the safety transmitter. This could, inter alia, be the signal/ safety transmitter type, the test period, the test pulse duration, the delay time Δt, and/or an input filtering time. Preferably, the safety transmitter-specific part 74 is stored in a so-called electronic data sheet.

The application-specific part includes signal parameters 72 which are functions of the connection topology. These could, for example, be the cable type or the cable length of the line, via which the safety transmitter 40, 60 is connected to the safety control system 10. The application-specific part thus includes those parameters which influence the input signal 58 independently of the safety transmitter 40, 60.

The safety transmitter-specific part and the application-specific part are preferably combined in a sensor definition file 78. This may be carried out on an external configuration system, indicated here by a PC 80. Via the configuration system 80, the user may preferably enter application-specific data with the aid of an application interface and connect it to the electronic data sheet of the safety transmitter. In this case, the electronic data sheet is preferably stored in a library, so that input errors when setting up the safety transmitter may be eliminated. The sensor definition file 78 generated by the configuration system 80 may include the safety transmitter-specific part and the application-specific part and may be transferred via a communication interface 82 to the setting unit 70. The communication interface 82 may be implemented via a wired or wireless transfer. Alternatively, the communication interface may also be established via a manual transfer, for example, with the aid of a portable storage medium.

Alternatively, the safety transmitter-specific part and the application-specific part may also be provided separately and combined only in the safety control system. For example, the safety transmitter-specific parameters are transferred to the safety control system in the form of an electronic data sheet, while the application-specific parameters are set directly at the safety controller. In this case, each transfer of safety-critical parameters is carried out secured in a "failsafe" system, as explained in greater detail by way of example based on FIG. 4.

Figure 4:
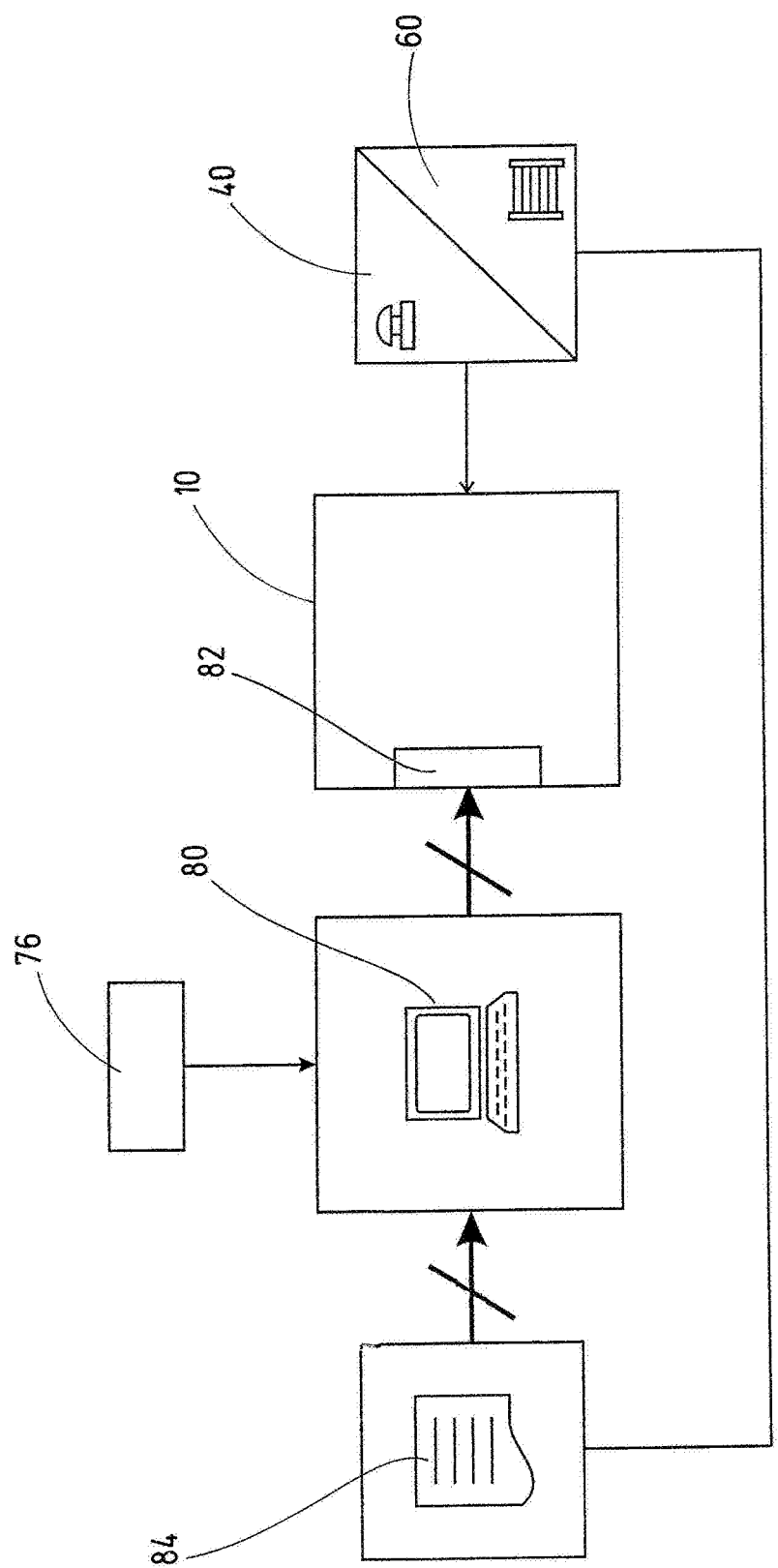
FIG. 4 shows a schematic representation of the configuration of the new safety control system.

FIG. 4 schematically depicts how the signal parameters 72 may be transferred to the setting unit 70 of the new safety control system. Active or passive safety transmitters are indicated here by the reference numerals 40, 60, which, as described based on the exemplary embodiments of FIGS. 1 to 3, interact with the safety control system 10. The safety transmitter-specific data are combined in an electronic data sheet 84.

The electronic data sheet is transferred securely to the configuration system 80. To secure the transfer, the electronic data sheet 84 may have a checksum, on the basis of which the configuration system 80 may check whether the electronic data sheet 84 has been transferred without modifications. Alternatively, the electronic data sheet 84 may also be kept available in a library which is stored in a memory of the configuration system, so that a secure transfer is not necessary.

Application-specific data 76 are also provided on the configuration system 80, preferably via a user input directly at the configuration system 80. The configuration system 80 merges the safety transmitter-specific data of the electronic data sheet 84 and the application-specific data 76 into a sensor definition file 78. When merging, the configuration system 80 also carries out a plausibility check. Based on this plausibility check, the configuration unit 80 checks whether the application-specific data 76 input by the user with safety transmitter-specific data of the electronic data sheet result in a valid configuration for the safety control system 10. Subsequently, the sensor definition file 78 is transferred via a secure connection to the safety control system 10 and stored in the setting unit 70.

In an alternative exemplary embodiment, the configuration system 80 may also be integrated into the safety control system 10. For this purpose, the safety control system preferably has an input unit via which an input of the application-specific and/or safety transmitter-specific data may take place. In an additional embodiment, the application-specific data may also be provided separately from the safety transmitter-specific data, for example, in that the safety transmitter-specific data are provided from outside the safety control system and the application-specific data are input directly at the safety control system.

Alternatively, a network connection or an interface for portable storage media may also be considered as a communication interface 82. Furthermore, in addition to the aforementioned checksum evaluation, other methods may also be used for secure transfer and verification.

What is claimed is:

1. A safety control system for switching on and safely switching off an actuator, comprising:
    an input module that evaluates an input signal received from a safety transmitter, which is connected to the input module via feed lines, and for generating an output signal based on the evaluation,
    an output module that actuates the actuator based on the output signal received from the input module, and
    a setting unit having a memory in which signal parameters are stored,
    wherein the input module is configured to derive an expected signal profile of the input signal from the stored signal parameters and to evaluate the input signal based on the expected signal profile of the input signal,
    wherein the stored signal parameters comprise information indicative of signal characteristics selected from the group consisting of pulse period or frequency, pulse duration, and delay time or offset between input and output pulses,
    wherein the input signal is a dynamic clock signal with test pulses having a defined test period and duration, wherein the defined period and duration represent a first signal parameter and a second signal parameter of the signal parameters used by the input module to derive the expected signal profile of the input signal, and wherein the safety transmitter is configured to modulate the test pulses onto the input signal supplied to the input module.

2. The safety control system as claimed in claim 1, wherein the input module has a first input for connecting the safety transmitter and at least a second input for connecting an additional safety transmitter, wherein a first set of signal parameters may be stored in the setting unit for the safety transmitter, and a second set of signal parameters may be stored in the setting unit for the additional safety transmitter.

3. A safety control system for switching on and safely switching off an actuator, comprising:
    an input module that evaluates an input signal received from a safety transmitter, which is connected to the input module via feed lines, and for generating an output signal based on the evaluation,
    an output module that actuates the actuator based on the output signal received from the input module, and
    a setting unit having a memory in which signal parameters are stored,
    wherein the input module is configured to derive an expected signal profile of the input signal from the stored signal parameters and to evaluate the input signal based on the expected signal profile of the input signal,
    wherein the stored signal parameters comprise information indicative of signal characteristics selected from the group consisting of pulse period or frequency, pulse duration, and delay time or offset between input and output pulses,
    wherein the input signal is a dynamic clock signal with test pulses having a defined test period and duration, and wherein the defined period and duration represent a first signal parameter and a second signal parameter of the signal parameters used by the input module to derive the expected signal profile of the input signal, and
    wherein the input module has at least one test output for providing to the safety transmitter a test signal comprising the dynamic clock signal with the test pulses, and wherein the safety transmitter transmits in response to the test signal the input signal having a signal profile that is used by the input module to derive the expected signal profile of the input signal.

4. The safety control system as claimed in claim 1, wherein the safety control system has a configuration system with a communication interface for configuring the setting unit, via which a set of signal parameters may be transferred to the setting unit.

5. The safety control system as claimed in claim 4, wherein the signal parameters are combined in a set for the safety transmitter and are stored in a sensor definition file, wherein the sensor definition file includes a sensor data section with safety transmitter-specific parameters of the safety transmitter and an application data section with application-specific parameters.

6. The safety control system as claimed in claim 5, wherein the sensor definition file has an individual checksum and the configuration system authenticates the sensor definition file based on the checksum.

7. The safety control system as claimed in claim 5, wherein the configuration system has at least one check algorithm for checking plausibility, which checks the application data section with respect to the sensor data section.

8. The safety control system as claimed in claim 3, wherein the safety transmitter generates in response to the test signal the input signal with a delay time $\Delta t$ relative to the test signal, and wherein the delay time $\Delta t$ is a parameter of the signal parameters used by the input module to derive the expected signal profile of the input signal.

* * * * *